United States Patent [19]

Rendall

[11] 3,864,289

[45] Feb. 4, 1975

[54] PREPARATION OF CELLULOSIC SEMI-PERMEABLE MEMBRANES

[75] Inventor: John L. Rendall, Greenville, S.C.

[73] Assignee: Koratec, Inc., San Francisco, Calif.

[22] Filed: Dec. 19, 1973

[21] Appl. No.: 426,133

Related U.S. Application Data

[63] Continuation-in-part of Ser. No. 132,215, April 7, 1971, abandoned.

[52] U.S. Cl............ 260/15, 204/159.12, 204/160.1, 210/23, 210/500, 260/17, 260/214, 264/41
[51] Int. Cl........................ B01d 39/14, C08g 21/08
[58] Field of Search ................ 264/41; 210/23, 500; 260/15, 17, 214; 204/159.12, 160.1

[56] References Cited

UNITED STATES PATENTS

| | | | |
|---|---|---|---|
| 3,254,939 | 6/1966 | Munzel | 204/160.1 |
| 3,296,109 | 1/1967 | Leavitt | 204/160.1 |
| 3,428,584 | 2/1969 | Riley | 260/15 |
| 3,483,282 | 12/1969 | Manjikian | 210/500 |
| 3,491,022 | 1/1970 | Huff | 210/23 |
| 3,585,126 | 6/1971 | Cannon et al. | 210/23 |
| 3,607,329 | 9/1971 | Manjikian | 210/500 |
| 3,657,115 | 4/1972 | Manjikian et al. | 210/23 |

FOREIGN PATENTS OR APPLICATIONS

| | | | |
|---|---|---|---|
| 464,282 | 4/1950 | Canada | 260/15 |

*Primary Examiner*—Melvin Goldstein
*Assistant Examiner*—Edward Woodberry
*Attorney, Agent, or Firm*—Lyon & Lyon

[57] ABSTRACT

A process for the preparation of cellulosic semi-permeable membranes is disclosed in which the membrane is formed from a formulation containing a cellulosic membrane material, a cellulosic cross-linking agent and a blocking agent. After formation, the membrane is cured, preferably by being subjectd to microwave radiation.

15 Claims, No Drawings

PREPARATION OF CELLULOSIC SEMI-PERMEABLE MEMBRANES

This application is a continuation-in-part of my co-pending application, Ser. No. 132,215, filed Apr. 7, 1971, entitled "PREPARATION OF CELLULOSIC SEMI-PERMEABLE MEMBRANE," now abandoned.

BACKGROUND OF THE INVENTION

This invention relates generally as indicated to semi-permeable membranes, and more particularly to a process for preparing semi-permeable membranes which are suited for use in processes such as reverse osmosis for the purification of water and other liquids. As is known, semi-permeable membranes permit the free passage of pure water or other solvent and at the same time prevent the passage of various solutes such as sodium chloride in sea water or brackish or other nonpotable water and other contaminants such as paraffin or asphalt in gasoline.

Semi-permeable membranes of different types have been proposes, such as those disclosed in U.S. Pat. Nos. 3,133,132, 3,133,137 and 3,460,683. In general, these membranes are cast from a solution of cellulose acetate or diacetate or other cellulosic material and a pore forming agent in a suitable solvent such as acetone. In the formation of these membranes, after casting, the solvent is normally permitted to evaporate, after which the film is immersed in water and thereafter partially dried and maintained in a damp state until used. The membranes thus formed are highly anisotropic and consist of a relatively thin skin, as for example, approximately 0.5 to 1.0 microns in thickness, with a thicker porous backing (50 to 100 microns) which has a cellular structure and permits an appreciable rate of passage of fresh water or other solvent under suitable conditions.

When semi-permeable membranes are used, as for example in the purification of salt water, pressure is applied to the solution side of the membrane sufficient to overcome osmotic pressure, thereby forcing fresh water through the membrane. To achieve this, however, it is necessary to maintain a high pressure differential, as for example, on the order of 1,500 psig, across the membrane. It is well known that the flux rate, that is the rate of passage of fluid through the membrane, decreases with time necessitating frequent replacement of the membrane in order to maintain a suitable flux rate. The decrease in flux rate is believed to be caused at least in part by compression or compaction of the membrane which occurs in use as a result of this pressure differential. The compression or compaction of the membranes, of course, increases the resistance to flow through the membrane and hence contributes to the decrease in flux rate.

Although various attempts have been made to provide suitable semi-permeable membranes, as shown by the previously noted patents and by U.S. Pat. Nos. 3,438,893, 3,444,286, 3,429,957 and 3,428,584, there is still the need for semi-permeable membranes which can provide an improved useful life in terms of an adequate flux rate and satisfactory purification of water.

SUMMARY OF THE INVENTION

In the present invention, a cellulosic semi-permeable membrane is formed from a formulation containing a cellulosic membrane material, a cross-linking agent, a catalyst and a chemical blocking agent. After formation, the membrane is subjected to curing conditions preferably utilizing microwave radiation to achieve the desired cross-linking of the cellulosic structure and at the same time avoiding substantial shrinking of the membrane during curing.

DESCRIPTION OF PREFERRED EMBODIMENTS

The semi-permeable membrane of this invention may be formed from any of the known cellulosic membrane formers, including the various cellulose acetates, eg., cellulose diacetate, cellulose acetate, and cellulose acetate butyrate, cellulose butyrate, cellulose acetopropionates, cellulose nitrate, ethyl cellulose and other esters and ethers of cellulose.

Suitable cross-linking agents include those ordinarily used for cross-linking cellulose, such as noncyclic and cyclic urea type formaldehyde reactants such as dimethyol dihydroxy imidazolidone having the structure,

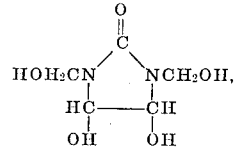

methylol ureas such as dimethyol ethylene urea (DMEU) dimethyol propylene urea, methylolated melamines, methylolated amino triazines, formaldehyde and glyoxal. Polyfunctional disldehydes such as succinic dialdehyde or adipic dialdehyde may also be used, as well as other cellulosic cross-linking agents, such as alkylated derivatives of the above described agents, methylolated carbamates and urons. In some instances, cross-linking agents in the vapor state such as formaldehyde may also be used. One preferred cross-linking agent is a solution of dimethyol dihydroxy imidazolidone, which is available commercially under the trade designation "Permafresh 183" from Sun Chemical Company.

In addition to the above described cross-linking agents, self cross-linking polyacrylates may be used, such as those available commercially under the "Rhoplex" and "Nacrylic" designations from Rohm & Haas and National Strach Company respectively. In general, such polyacrylates are emulsion copolymers of acrylic acids, such as acrylic acid, methacrylic acid and itaconic acid, with monohydric alcohols having from one to 12 carbon atoms, such as methanol, ethanol, butanol, etc. Additionally, self-crosslinking polyacrylates available from Rohm & Haas under the designations "HA-8" and "HA-12" are suitable. If desired, it is also possible to utilize mixtures of the cross-linking agents described above and self cross-linking polyacrylates.

As indicated previously, when the formed membrane is subjected to curing conditions, the cross-linking agent reacts with the cellulosic membrane to produce a cross-linked system which provides increased resistance of the membrane to compression or compaction. The formulation also includes a chemical blocking agent which is also believed to provide resistance to compaction or compression by serving to hold open, as by blocking or wedging the interstices between the polymer molecules within the membrane, both curing and after curing.

The chemical blocking agent may be either reactive or nonreactive with the polymer molecules. Nonreactive blocking agents which may be used include glycerol and ethylene glycol, which are believed to function merely by reason of molecular size to produce a physical block or wedge between the molecular chains of the polymer. Both mono and difunctional reactive blocking agents may be used. Examples of monofunctional blocking agents are monomethylolated amides, monomethylolatedureas, cyclic ureas, and cyclic ethylene ureas which have been reacted with one molecule of formaldehyde. Monomethylol ethylene urea is a particularly useful monofunctional blocking agent. Suitable difunctional blocking agents include methylolated melamines, such as the methylolated melamine solution available under the trademark "Aerotex M-3." The defunctional blocking agents are believed to function not only as chemical wedges in the manner described above but also as cross-linking agents. Their ability to perform a blocking function results from their molecular size, and the ability to cross-link, of course, results from their difunctionality.

The membrane formulation will also include a suitable catalyst for the cross-linking reaction, which will normally be an acid catalyst, either an organic or inorganic acid or an acid salt. In some instances, compounds such as sulfur dioxide may also be used. The selection of a particular catalyst will, of course, depend upon the cross-linking agent which is used, but consideration should also be given to the effects of the catalyst upon the cellulosic membrane former, as the catalyst must not substantially degrade the membrane. Zinc nitrate is a suitable catalyst which will not significantly degrade cellulosic membranes; other catalysts may also be used, including hydrochloric acid and citric acid.

To prepare the membrane formulation, the previously described materials are dissolved in a suitable solvent or solvent combination such as acetone, methyl or ethyl alcohol, water, acetic acid, methyl ethyl ketone, methyl acetate, ethyl lactate, 1,4-dioxone, DMF, DMSO, THF, etc. The solvent is normally used in sufficient quantity to provide a solution and consequently is susceptible to some variation. Obviously, for economic reasons, the quantity of solvent will be kept to a minimum and will typically be used in a quantity, based on the ratio of solvent to cellulosic membrane material, of between 2 to 1 and about 5 to 1 by weight. For example, if 10 grams of cellulose acetate is used, from 20 to 50 grams of acetic acid will be required to dissolve the cellulose acetate, with the exact amount varying somewhat depending on the acetyl content of the cellulose acetate.

The quantity of the cross-linking and blocking agents may also be varied. The blocking agent and cross-linking agent each typically will comprise from about 0.3 to about 7.5% by weight, based on the total weight of solids in the solution. The quantity of the catalyst ordinarily will be from about 0.3 to about 3.0 weight percent, based on the weight of total solids, but this may also vary depending upon the particular catalyst which is used. In any event, the quantity of catalyst should be sufficient to retain the pH of the solution within the range of from about 3.8 to about 4.2.

One example of a suitable formulation, using ten parts of cellulose acetate having an acetyl content in the range of about 37 to about 41%, includes 40 parts of a solvent combination of acetic acid and water (approximate 4.1 ratio), 0.3 parts of the described imidazolidone crosslinking agent, 0.3 parts of the "Aerotex M-3" methylolated melamine, and 0.05 parts of zinc nitrate catalyst.

After the formulation has been prepared, the membrane may be formed by casting the solution upon a smooth flat surface so that a thin layer of uniform thickness is obtained. The casting operation is regulated so that the thickness of the cast membrane typically is on the order of about 100 microns. The cast membrane may remain in contact with the atmosphere for approximately one minute to permit solvent to evaporate and thereafter immersed in water at a temperature of about 1° C., where it remains for a sufficient time to set up and remove unevaporated solvent by diffusion into the water. It will be appreciated, however, that casting procedures other than that described may be used, including those described in U.S. Pat. Nos. 3,133,132 and 3,460,683.

After the membrane has been formed, it will be cured to produce the desired cross-linking. Although curing may be effected in other ways, e.g. oven curing, this is achieved preferably by subjecting the membrane to microwave radiation in a suitable environment such as a hot air oven. The temperature in the oven should be maintained near the curing temperature of the cross-linking system, and in general, temperatures between about 140° to about 500° F. may be used. By utilizing a hot air oven, the transfer of heat generated within the membrane by the microwaves is greatly reduced or eliminated. It is also helpful to move gently the membrane while it is being subjected to the microwave radiation, since movement tends to decrease any localized heating caused by uneven application of microwaves, and thus provides for more uniform curing and helps to minimize shrinkage of the membrane. The use of a microwave stirrer is also useful for the same purpose, and, of course, movement of the membrane may also be achieved by use of a continuous process in which the membrane is moved continuously through the oven.

Another technique which may be used to advantage during curing to minimize shrinkage of the membrane is to insulate the membrane with a layer of material which permits the escape of vapor. This may be achieved simply by covering the uncured membrane with an insulating material such as a fabric or paper.

Microwave heating, of course, results from the exposure of the material to be cured to the emission of oscillator tubes, such as magnetrons and kylstrons, which generate a high frequency microwave energy. The Federal Communications Comission has set aside the following frequencies for microwave processing:

195 megacycles/second + 25 mc./second
2450 megacycles/second + 50 mc./second
5800 megacycles/second + 55 mc./second
17925 megacycles/second + 75 mc./second
22125 megacycles/second +125 mc./second Further information on microwave processing is available in a booklet entitled "Microwave Heating in Freeze Drying, Electronic Ovens, and Other Applications," David Copson, Avi Publishing Company, 1962.

The extent of microwave radiation is dependent upon both the resin and catalyst as well as the type of microwave equipment which is used. The radiation time must, of course, be sufficient to produce substantial crosslinking of the membrane. Using a Raytheon Radar Range, modified with infrared heating elements, and a movable membrane, a low setting will preferably be used, which is equivalent to a level of 875 watts. Using resing catalyzed with sinc mitrate, a 5 minute microwave curing time normally is ample, and in same instances, using a hydrochloric acid catalyst system, a shorter curing time is satisfactory. In general, the microwave frequency should be at least about 900 negacycles for a period of from 10 to 300 seconds.

Microwave curing is also believed to provide increased resiliency to the membrane, which enables the membrane to resist more effectively the effects of pressure in use. By the same token, it is believed that microwave curing creates more uniform blocking and cross-linking throughout the thickness of the membrane.

In the present invention, since the cross-linking and blocking agents are added to the membrane formulation prior to preparation of the membrane, somewhat smaller quantities of chemicals may be used than in a process where the cross-linking and blocking agents are added to the membrane after formations. Also, it is not necessary to utilize a wetting agent which is helpful to facilitate penetration of the cross-linking and blocking agents when applied to a previously formed membrane. By the same token, only a single process is involved in the formation and curing of the semi-perneable membrane in the present invention, which simplifies the necessary processing.

With the present invention, it is also possible to form semi-permeable membranes in tubular form or other form since the cross-linking and blocking agents are incorporated in the initial formulation, whereas it is difficult either to form a tube after the membrane has been initially formed and the cross-linking and blocking agents thereafter applied or to apply uniformly these agents to a tubular membrane.

I claim:

1. A process for the preparation of self-supporting cellulosic semi-permeable membranes comprising forming a membrane from a formulation containing a film forming cellulosic membrane material, a cellulosic cross-linking agent, a catalyst to facilitate cross-linking of said membrane, and a chemical blocking agent to facilitate holding open of the polymer molecules within the membrane, and thereafter subjecting the formed membrane to microwave radiation to elevate the temperature of said membrane to cause cross-linking to occur.

2. The process of claim 1 in which said membrane material is selected from the group consisting of a cellulose acetate, cellulose diacetate, cellulose acetate butyrate, cellulose butyrate, cellulose acetopropionate, cellulose nitrate and ethyl cellulose.

3. The process of claim 1 in which said cross-linking agent is a urea-type formaldehyde reactant.

4. The process of claim 1 in which said cross-linking agent is selected from the group consisting of dimethylol dihydroxy imidazolidone, methylol ureas, dimethylol propylene urea, methylolated melamines, methylolated amino triazines, formaldehyde, glyoxal, polyfunctional dialdehydes, methylolated carbamates, urons, self-cross-linking polyacrylates and mixtures thereof.

5. The process of claim 1 in which said chemical blocking agent is monomethylolated amide.

6. The process of claim 1 in which said chemical blocking agent is selected from the group consiting of monomethylolated amides, monomethylolated ureas, cyclic ureas, and methylolated melamines.

7. The process of claim 1 in which said membrane is insulated while subjected to said microwave radiation to prevent loss of heat generated within the membrane but permitting vapor to escape from said membrane.

8. The process of claim 1 in which said membrane is continually moved while subjected to said microwave radiation.

9. The process of claim 1 in which the microwaves are continually stirred while said membrane is subjected to said microwave radiation.

10. The process of claim 1 in which the temperature is between about 140° to about 500° F. while said membrane is subjected to said microwave radiation.

11. The process of claim 1 in which said catalyst is an acid catalyst.

12. The process of claim 1 in which said formulation contains about 0.3 to about 7.50 by weight, based on the total weight of solids, of said cross-linking agent and of said chemical blocking agent.

13. In a process for the preparation of self-supporting cellulosic semi-permeable membranes in which said membranes are cast from a membrane formulation, the improvement comprising casting said membrane from a formulation containing a film forming cellulosic membrane material, a cellulosic cross-liking agent, a catalyst to facilitate cross-linking of said cellulosic membrane, and a chemical blocking agent to facilitate holding open of the polymer molecules within the membrane, and thereafter elevating the temperature of said cast membrane to cause cross-linking to occur and to cure said membrane.

14. A process for the preparation of a self-supporting cellulosic semi-permeable membrane comprising forming said membrane from a solution containing a film forming cellulose acetate, a cellulosic crosslinking agent, a catalyst to facilitate crosslinking, and a chemical blocking agent to facilitate holding open of the polymer molecules within said membrane, said cellulosic crosslinking agent and said chemical blocking agent each being present in a quantity of from about 0.3 to about 7.5 per cent by weight, based on the total weight of solids in said solution, and subjecting said formed membrane to microwave radiation to elevate the temperature of said membrane to cause crosslinking to occur.

15. The process of claim 14 in which said microwave radiation is at a temperature within the range of from about 140° to about 500° F. and said membrane is subjected to said microwave radiation for an interval of from about 10 to about 300 seconds.

* * * * *